US011934602B2

(12) United States Patent
Song et al.

(10) Patent No.: US 11,934,602 B2
(45) Date of Patent: Mar. 19, 2024

(54) ELECTRONIC DEVICE AND OPERATION METHOD OF ELECTRONIC DEVICE FOR SUPPORTING ONE HANDED OPERATION MODE

(71) Applicant: SAMSUNG ELECTRONICS CO., LTD., Suwon-si (KR)

(72) Inventors: Hyunkeun Song, Suwon-si (KR); Seungjun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/091,137

(22) Filed: Dec. 29, 2022

(65) Prior Publication Data
US 2023/0176678 A1 Jun. 8, 2023

Related U.S. Application Data

(63) Continuation of application No. PCT/KR2022/019799, filed on Dec. 7, 2022.

(30) Foreign Application Priority Data

Dec. 8, 2021 (KR) .................. 10-2021-0174504
Jan. 19, 2022 (KR) .................. 10-2022-0007751

(51) Int. Cl.
*G06F 3/041* (2006.01)
*G06F 3/01* (2006.01)
*G06F 3/04883* (2022.01)

(52) U.S. Cl.
CPC ............ *G06F 3/0416* (2013.01); *G06F 3/017* (2013.01); *G06F 3/04883* (2013.01)

(58) Field of Classification Search
CPC ..... G06F 3/017; G06F 3/0416; G06F 3/04883
See application file for complete search history.

(56) References Cited

U.S. PATENT DOCUMENTS 9,952,690 B2 4/2018 Taguchi et al.
10,048,793 B2 8/2018 Park et al.
(Continued)

FOREIGN PATENT DOCUMENTS

JP 7035662 B2 3/2022
KR 10-2011-0115683 10/2011
(Continued)

OTHER PUBLICATIONS

Search Report and Written Opinion dated Feb. 24, 2023 issued in International Patent Application No. PCT/KR2022/019799.

*Primary Examiner* — Ryan A Lubit
(74) *Attorney, Agent, or Firm* — Nixon & Vanderhye P.C.

(57) ABSTRACT

An electronic device according to the disclosure may include: a display including a first area and a second area; a first sensor and a second sensor disposed oppositely on at least a part of or an adjacent side surface corresponding to the first area and the second area of the display, each of the first sensor and the second sensor configured to detect a grip; and a processor operatively connected to the display, the first sensor, and the second sensor, wherein the processor is configured to: detect a grip based on a sensor value change of one of the first sensor or the second sensor, receive a touch input sensed in at least a partial area of one of the first area or the second area of the display corresponding to the sensor among the first sensor or the second sensor detecting the grip, and convert into a touch input targeting an entire area of the display including the first area and the second area.

20 Claims, 11 Drawing Sheets

(56) References Cited

U.S. PATENT DOCUMENTS

| | | | |
|---|---|---|---|
| 10,073,613 B2 | 9/2018 | Liao et al. | |
| 10,353,570 B1 | 7/2019 | Letourneur | |
| 10,572,145 B2 | 2/2020 | Kim et al. | |
| 10,732,833 B2 | 8/2020 | Choi et al. | |
| 2014/0351761 A1* | 11/2014 | Bae | G06F 3/04817 |
| | | | 715/835 |
| 2015/0062002 A1 | 3/2015 | Lee et al. | |
| 2015/0082230 A1 | 3/2015 | Lee et al. | |
| 2016/0062515 A1* | 3/2016 | Bae | G06F 3/0416 |
| | | | 345/174 |
| 2016/0188197 A1* | 6/2016 | Ryu | G06F 3/017 |
| | | | 345/156 |
| 2017/0212631 A1 | 7/2017 | Kim et al. | |
| 2017/0235484 A1* | 8/2017 | Griffin | G06F 3/041 |
| | | | 715/773 |
| 2018/0004386 A1* | 1/2018 | Hinckley | G06F 3/0416 |
| 2018/0330694 A1* | 11/2018 | Klein | G06F 3/04186 |
| 2019/0287492 A1 | 9/2019 | Kanamaru | |
| 2020/0201501 A1* | 6/2020 | Rho | G06F 3/04883 |
| 2021/0337049 A1* | 10/2021 | Noh | H04M 1/0237 |
| 2023/0012245 A1 | 1/2023 | Li et al. | |

FOREIGN PATENT DOCUMENTS

| | | |
|---|---|---|
| KR | 10-1432483 B1 | 8/2014 |
| KR | 10-2014-0137996 | 12/2014 |
| KR | 10-2014--0147647 | 12/2014 |
| KR | 10-1504310 B1 | 3/2015 |
| KR | 10-2016-0019762 | 2/2016 |
| KR | 10-2017-0088691 | 8/2017 |
| KR | 10-1977075 | 5/2019 |
| KR | 10-2009279 | 8/2019 |
| KR | 10-2156799 | 9/2020 |

\* cited by examiner

ELECTRONIC DEVICE AND OPERATION METHOD OF ELECTRONIC DEVICE FOR SUPPORTING ONE HANDED OPERATION MODE

CROSS-REFERENCE TO RELATED APPLICATIONS

This application is a continuation of International Application No. PCT/KR2022/019799 designating the United States, filed on Dec. 7, 2022, in the Korean Intellectual Property Receiving Office and claiming priority to Korean Patent Application No. 10-2021-0174504, filed on Dec. 8, 2021, in the Korean Intellectual Property Office, and to Korean Patent Application No. 10-2022-0007751, filed on Jan. 19, 2022, in the Korean Intellectual Property Office, the disclosures of all of which are incorporated by reference herein in their entireties.

BACKGROUND

Field

The disclosure relates to an electronic device supporting a one handed operation mode and an operating method of the electronic device, for example, to an electronic device supporting a one handed operation mode for performing a touch input with one hand and an operating method of the electronic device.

Description of Related Art

Recently, with the trend of various contents being consumed and various functions being used while a large screen display is being looked at, the number of bar type smartphones equipped with a large screen display has been increasing and smartphones equipped with a large screen display such as foldable phones or rollable phones are appearing.

Electronic devices such as small-sized smartphones used to be operated with one hand in the past, but it is common to support the terminal with both hands and operate the touch screen with the fingers of both hands in relatively large electronic devices such as smartphones equipped with large screen displays.

An electronic device equipped with a general large screen display is difficult to operate with one hand; and, even in the case that a one handed operation mode is supported, a separate operation for entering the mode is required or it is difficult to distinguish from a general touch input, which may cause a malfunction in many cases.

SUMMARY

Embodiments of the disclosure provide an electronic device supporting a one handed operation mode in which a touch input is able to be performed with one hand.

Embodiments of the disclosure provide an electronic device capable of entering the one handed operation mode without a separate operation and performing the one handed operation mode.

An electronic device according to various example embodiments of the disclosure may include: a display including a first area and a second area; a first sensor and a second sensor disposed oppositely on at least a part of or an adjacent side surface corresponding to the first area and the second area of the display and each configured to detect a grip; and a processor operatively connected to the display, the first sensor and the second sensor, wherein the processor is configured to: detect a grip based on sensor value change of one of the first sensor or the second sensor, receive a touch input sensed in at least a partial area of one of the first area or the second area of the display corresponding to the sensor detecting the grip among the first sensor or the second sensor; and convert to a touch input targeting the entire display area including the first area and the second area.

A method of operating an electronic device according to various example embodiments of the disclosure may include: detecting a grip based on a sensor value change in one of the first sensor or the second sensor disposed oppositely on at least a part of or an adjacent side surface corresponding to a first area and a second area of the display including the first area and the second area and each detecting a grip; receiving a touch input sensed in at least a partial area of one of the first area or the second area of the display corresponding to the sensor detecting the grip among the first sensor or the second sensor; and converting to a touch input targeting the entire display area including the first area and the second area.

An electronic device according to an example embodiment of the disclosure may enter the one handed operation mode without a separate operation and perform the one handed operation mode, so that convenience of use may be increased.

An electronic device according to an example embodiment of the disclosure may support performing a touch input on the entire screen with one hand while maintaining the display screen in the full screen.

In addition, it is possible to provide various effects that are directly or indirectly identified through this disclosure.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
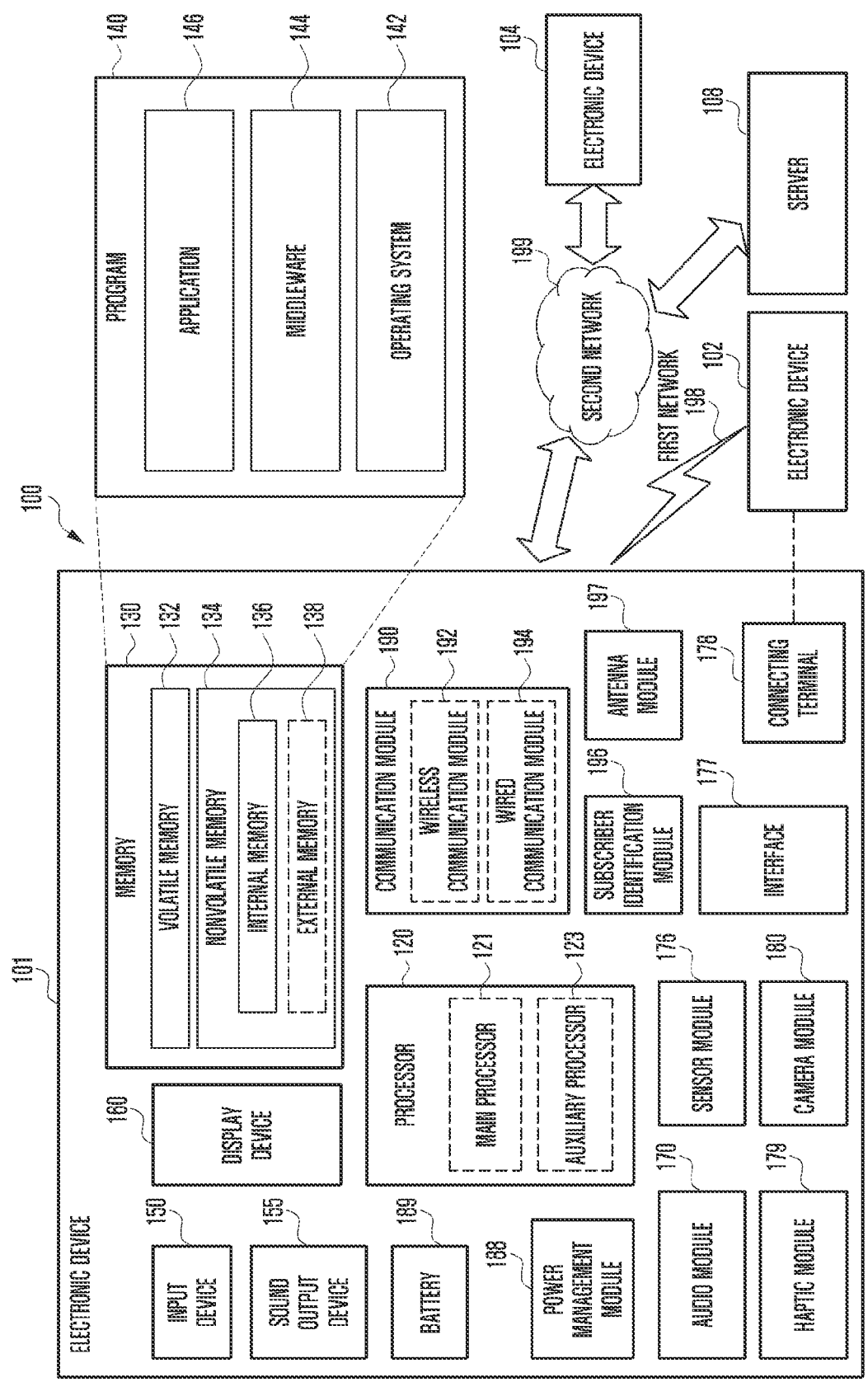
FIG. 1 is a block diagram illustrating an example electronic device in a network environment according to various embodiments.

FIG. 1 is a block diagram illustrating an example electronic device 101 in a network environment 100 according to various embodiments. With reference to FIG. 1, the electronic device 101 in the network environment 100 may communicate with an electronic device 102 via a first network 198 (e.g., a short-range wireless communication network) or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation operations. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, in the case that the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101, where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof but it is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing a recording. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board or adjacent to the first surface and capable of supporting a designated high-frequency band (e.g., the mmWave band), and a plurality of antennas (e.g., array antennas) disposed on a second surface (e.g., the top or a side surface) of the printed circuit board or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of the same type as, or a different type from, the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C" may include any one of, or all possible combinations of, the items enumerated together in a corresponding one of the phrases. As used herein, such terms as "$1^{st}$" and "$2^{nd}$" or "first" and "second" may be used to simply distinguish a corresponding component from another, and they do not limit the components in other aspects (e.g., importance or order). It is to be understood that if an element (e.g., the first element) is referred to, with or without the term "operatively" or "communicatively," as "coupled with," "coupled to," "connected with," or "connected to" another element (e.g., the second element), the element may be coupled with the other element directly (e.g., wiredly), wirelessly, or via a third element.

Also embodiments disclosed in the disclosure and drawings of the disclosure are merely presented as specific examples to easily explain the technical content according to the embodiments of the disclosure and help the understanding of the embodiments of the disclosure, but they are not intended to limit the scope of the embodiments of the disclosure. Therefore, all changes or modifications derived from the technical ideals of the various embodiments of the disclosure should be interpreted to be included in the scope of the various embodiments of the disclosure in addition to the embodiments disclosed herein.

Figure 2:
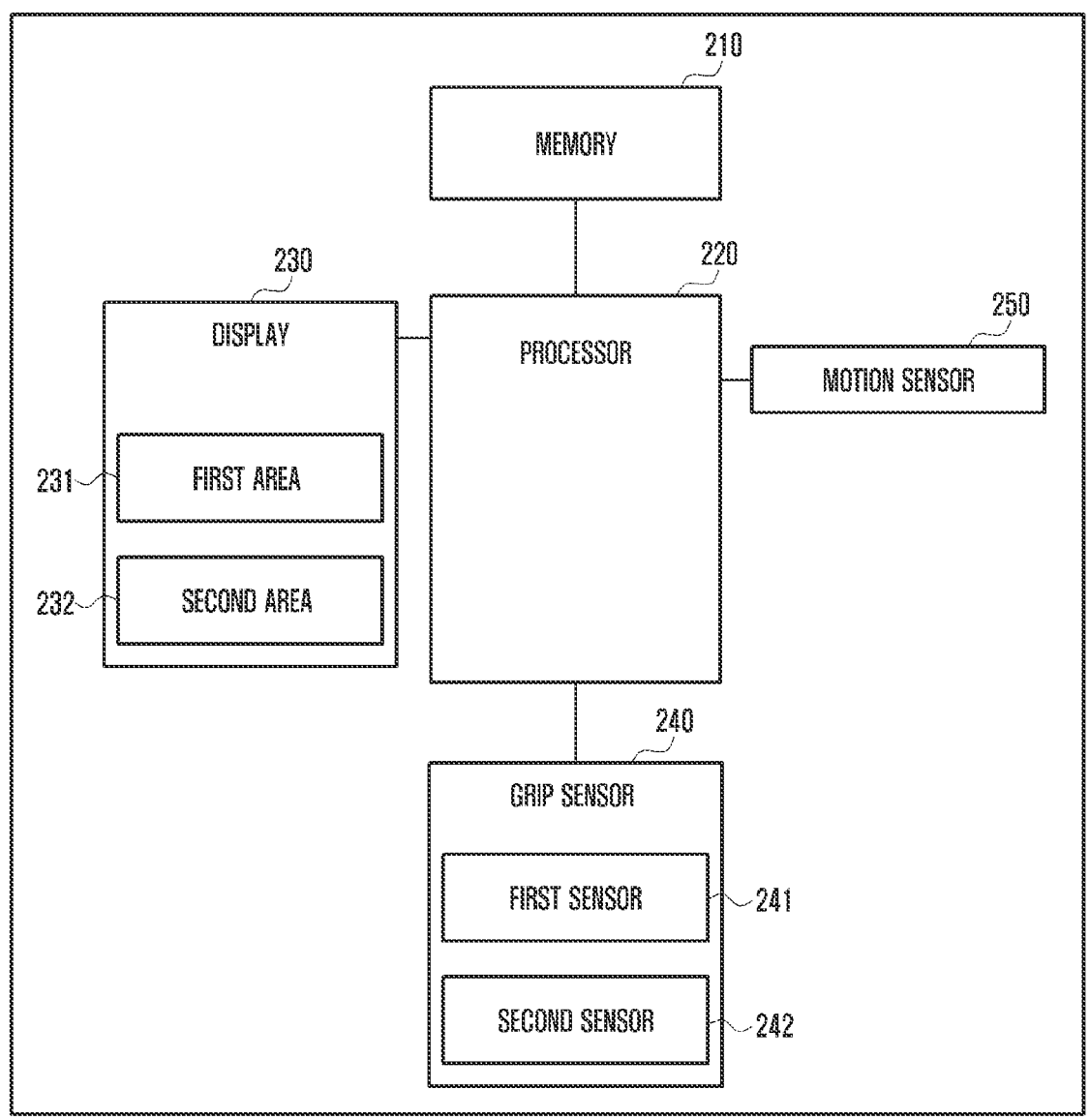
FIG. 2 is a block diagram illustrating an example configuration of an electronic device according to various embodiments.

FIG. 2 is a block diagram illustrating an example configuration of an electronic device 200 (e.g., the electronic device 101 of FIG. 1) according to various embodiments. The electronic device 200 of FIG. 2 may include various electronic devices such as, for example, a smartphone or a tablet. For example, the type of the electronic device 200 may include various types such as a bar type, a folding structure (e.g., a foldable phone), and an unfolding structure (e.g., a rollable phone), and it is not limited to the example described below.

With reference to FIG. 2, the electronic device 200 may include a memory 210 (e.g., the memory 130 of FIG. 1), a processor (e.g., including processing circuitry) 220 (e.g., the processor 120 of FIG. 1), a display 230 (e.g., the display module 160 of FIG. 1), a grip sensor 240 (e.g., the sensor module 176 of FIG. 1), and/or a motion sensor 250 (e.g., the sensor module 176 of FIG. 1). The components included in FIG. 2 are some of the components included in the electronic device 200 and the electronic device 200 may include various other components as illustrated in FIG. 1.

According to various embodiments, the display 230 may display various pieces of visual information such as image and/or text. The display 230 of the electronic device 200 may include two or more displays. Hereinafter, however, the display 230 may be explained mainly with the main display having the largest area in the electronic device 200.

According to various embodiments, the display 230 may include a touch sensor configured to detect a touch, a hovering sensor configured to detect hovering, and/or a pressure sensor configured to measure the intensity of a force generated by the touch.

According to various embodiments, the display 230 may be mounted on one surface of the electronic device 200. For example, in the case that the electronic device 200 is a bar type, the display 230 may be disposed in front of the electronic device 200. For example, in the case that the electronic device 200 is a foldable type, the display 230 may be disposed on a surface that is folded inward (in-folding) or a surface that is folded outward (out-folding) according to folding. For example, in the case that the electronic device 200 is a rollable type, the display 230 may be disposed on any one surface of the electronic device 200 to be rolled in or rolled out.

A display 230 according to various embodiments may include a first area 231 and a second area 232. The first area 231 and the second area 232 of the display 230 do not need to be physically separated areas, but they may be virtual divided areas.

According to various embodiments, the grip sensor 240 may include a plurality of grip sensors (e.g., the first sensor 241 and the second sensor 242). Each of the first sensor 241 and the second sensor 242, which are grip sensors, may be implemented in a pattern type or a plane shape and disposed on one surface of the electronic device 200.

According to various embodiments, the grip sensor 240 may be mounted on a surface opposite to the surface on which the display 230 is disposed. For example, in the case that the display 230 is disposed on the front side of the electronic device 200, the grip sensor 240 may be disposed on the back or side surface of the electronic device 200. For example, the first sensor 241 of the grip sensor 240 may be disposed at a position opposite to the first area 231 of the display 230, and the second sensor 242 may be disposed at a position opposite to the second area 232 of the display 230. For example, the grip sensor 240 may be disposed on a surface opposite to, or a side surface adjacent to, the side on which the display 230 is disposed. For example, the grip sensor 240 may be disposed on a lower portion of a surface opposite to the surface on which the display 230 is disposed. For example, the first sensor 241 of the grip sensor 240 may be disposed on a lower portion of a position opposite to the first area 231 of the display 230 or a side surface adjacent to the display 230, and the second sensor 242 may be disposed on a lower portion of the display 230 opposite to the second area 232 or a side surface adjacent to the display 230.

According to various embodiments, the display 230 may display various texts and contents including images, icons, and menus, and it may perform various operations in response to a touch input sensed through the input sensor 241.

According to various embodiments, the processor 220 may include various processing circuitry and detect the grip at the location where one of the first sensor 241 or the second sensor 242 is placed based on the sensor value change of one of the first sensor 241 or the second sensor 242 of the grip sensor 240.

According to various embodiments, the processor 220 may identify a touch input targeting the entire area of the display 230 in response to a touch input of a portion of the area of the display 230 where the grip sensor detecting the grip is located. For example, the processor 220 may perform mapping as a sliding touch input with a size corresponding to the entire area of the display 230 in response to the size of the sliding touch input in the case that a sliding touch input is received with respect to a part of the display 230 area on the side where the grip is detected. For example, the processor 220 may recognize that the sliding touch input is generated over the entire area of the display 230 without being limited to a part of the display 230 on which the sliding touch input is actually performed. Accordingly, the processor 220 may control the display 230 to perform an operation corresponding to a sliding touch input targeting the entire area of the display 230. For example, in the case that a specific icon is selected in a partial area of the display 230 on the side where the grip is detected on the display 230 and a sliding touch input is performed within the partial area, the processor 220 may identify that the sliding touch input is performed targeting the entire area of the display 230 for the corresponding icon, and it may enable the corresponding icon to move in the entire area of the display 230 beyond the partial area where the sliding touch input is performed.

According to various embodiments, the processor 220, for example, in the case that the processor 220 detects the grip according to the sensor value change of the first sensor 241, may sense a touch input generated in the partial area on the first area 231 of the display 230 opposite to the position of the first sensor 241; in response thereto, convert to the touch input of the entire area of the display 230; and perform an operation in response to the corresponding touch input. For example, a touch input generated in a partial area may be converted into a touch input for the entire area by calculating a relative position of the entire area with respect to a location where the touch input occurred in the partial area. For example, by calculating a relative position in a partial area with respect to a touch input (e.g., (x, y) coordinates) generated in the partial area, and calculating a relative position corresponding to the entire area based on this, a touch input generated with respect to the partial area may be converted into a touch input for the entire area. For example, a touch input generated in the partial area may be converted into a touch input for the entire area based on a ratio according to a difference between the area of the partial area and the area of the entire area. For example, a touch input generated in a partial area may be converted into a touch input for the entire area based on a ratio of the horizontal, vertical, and/or diagonal length of the partial area to the horizontal, vertical, and/or diagonal length of the entire area. For example, a touch input generated in a partial area may be converted into at least one coordinate for the entire area based on the ratio described above with respect to at least one coordinate at which the touch input is generated and converted into a touch input for the entire area. For example, a touch input generated in a partial area may be converted into a touch input for the entire area as at least one coordinate (e.g., (x, y) at which the touch input is generated is converted into at least one coordinate (e.g., (5x, 5y) based on the above-described ratio (e.g., 5 times each horizontally and vertically).

According to various embodiments, the motion sensor 250 may include a gyro sensor and/or an acceleration sensor, or the like. The processor 220 may identify the posture of the electronic device 200 based on the sensor value of the motion sensor 250. The posture of the electronic device 200 may include, for example, an upright posture in which the electronic device 200 is held upright, a state in which it is rotated 90 degrees or 270 degrees to the left and right, and a state in which it is rotated upside down by 180 degrees.

Figure 3:
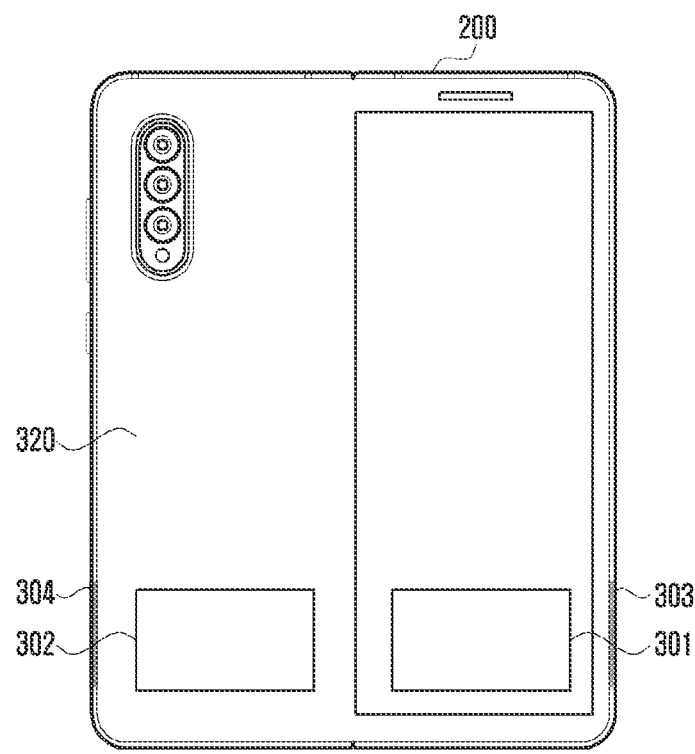
FIG. 3 is a diagram illustrating an example of applying a one handed operation mode according to the arrangement of a display and a grip sensor of an electronic device according to various embodiments.
Figure 3:
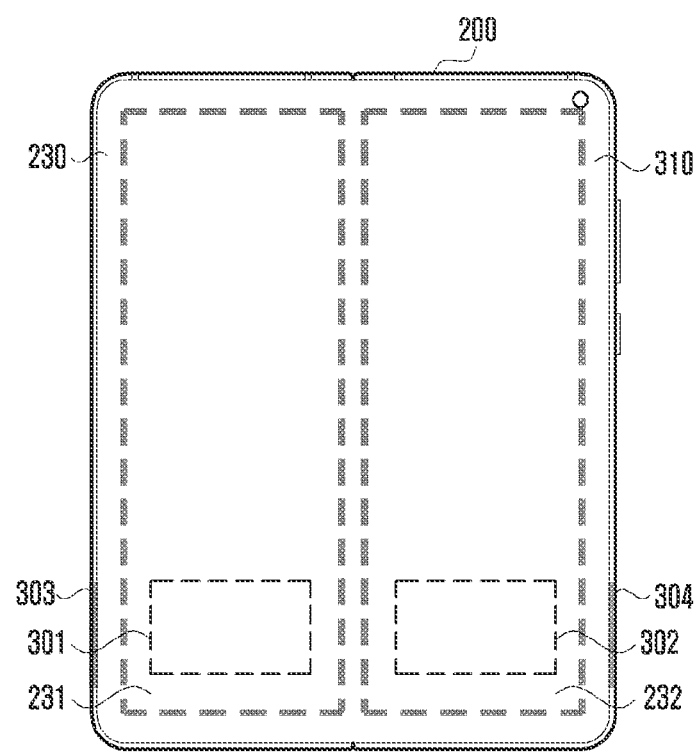

FIG. 3 is a diagram illustrating an example of a one handed operation mode application according to the arrangement of a display (e.g., the display 230 of FIG. 2) and a grip sensor (e.g., the grip sensor 240 of FIG. 2) of an electronic device (e.g., the electronic device 200 of FIG. 2) according to various embodiments.

With reference to FIG. 3, the display 230 may be disposed on the front surface 310 of the electronic device 200 according to various embodiments, and a grip sensor 240 (e.g., the first sensor 241 and the second sensor 242 of FIG. 2) may be disposed on the rear surface 320 opposite to the front surface 310 on which the display 230 is disposed.

According to various embodiments, the display 230 may include a first area (e.g., the first area 231 of FIG. 2) and a second area (e.g., the second area 232 of FIG. 2).

According to various embodiments, the first sensor 241 of the grip sensor 240 may be disposed on the opposite surface 310 at a position 301 opposite to the first area 231 of the display 230 and the second sensor 242 may be disposed on the opposite surface 302 opposite to the second area 232 of the display 230.

According to various embodiments, the first sensor 241 of the grip sensor 240 may be disposed at a lower portion 301 of the opposite surface corresponding to the first area 231 of the display 230 or a side surface 303 adjacent to the first area 231. In addition, the second sensor 242 of the grip sensor 240 may be disposed at a lower portion 302 of the opposite surface corresponding to the second area 232 of the display 230 or a side surface 304 adjacent to the second area 232. Hereinafter, the proximity sensor will be explained as an example that the first sensor 241 and the second sensor 242 are installed, but the number and installation location of the proximity sensors are not limited thereto, and two or more (e.g., four), for example, various implementations may be possible such as an example in which the display is installed on the rear surface or the side surface opposite to the corner portion of the display.

According to various embodiments, the electronic device 200 may identify or map a touch input targeting the entire area of the display 230 in response to a touch input applied to a portion of the area of the display 230 where the grip sensor detecting the grip is located.

According to various embodiments, in the case that the electronic device 200, for example, detects a grip by the first sensor 241, the electronic device 200 may sense a touch input generated in a partial area of the first area 231 (e.g., the lower portion of the first area that is opposite or adjacent to the first sensor 241) of the display 230 corresponding to the position 301 or 303 of the first sensor 241; and, in response to this, may perform an operation targeting the entire area of the display 230. In this case, the grip by the second sensor 242 may not be detected; and, in the case that the grip is detected by both sensors, the two handed operation mode may be performed.

According to various embodiments, in the case that the electronic device 200, for example, senses a grip by the second sensor 242, the electronic device 200 may detect a touch input generated in a partial area of the second area 232 (e.g., the lower portion of the second area that is opposite or adjacent to the second sensor 242) of the display 230 corresponding to the position 302 of the second sensor 242; and, in response to this, may perform an operation targeting the entire area of the display 230. In this case, the grip by the first sensor 241 may not be detected; and, in the case that the grip is detected by both sensors, the two handed operation mode may be performed.

According to various embodiments, in the case that the electronic device 200, for example, detects a grip by the second sensor 242, the electronic device 200 may define a partial area of the second area 232 (e.g., the lower portion of the second area) corresponding to the position 302 of the second sensor 242 as an area for receiving a touch input.

According to an embodiment, in the case that the posture of the electronic device 200 is a posture capable of grip detection by a grip sensor (e.g., in the case of a posture that is not rotated as shown in FIG. 3, or a posture rotated by 90 degrees or 270 degrees), the one handed operation mode may be performed based on the detection position of the grip sensor, and an area for receiving a touch input may be defined based on the grip detection position. In this case, an area for receiving a touch input may be defined by considering a hovering detection position in addition to the grip detection position.

According to an embodiment, in the case that the posture of the electronic device 200 is a posture in which grip detection by the grip sensor is impossible (e.g., in the case of being rotated by 180 degrees), the electronic device 200 may decide whether to perform the one handed operation mode based on the hovering occurrence position and may define an area for receiving a touch input based on the hovering occurrence location in the case of performing the one handed operation mode.

An electronic device 200 may display an area defined for receiving a touch input on the display 230. The electronic device 200 may perform an operation according to a touch input targeting the entire area of the display 230 in response to a touch input received in the touch input receiving area of the display 230.

According to various embodiments, the electronic device 200 may perform an operation according to the touch input targeting the entire area of the display 230 in response to a touch input performed on a part of the display 230 with one hand. That is, the electronic device 200 may perform various operations such as an input operation on the entire display 230 by a touch input for a part of the display 230, for example, selection and movement of an object, such as an icon, and enlargement and reduction of the screen.

According to various example embodiments, an electronic device (e.g., the electronic device 200 of FIG. 2 or FIG. 3) may include: a display (e.g., display 230 of FIG. 2 or FIG. 3) including a first area (e.g., the first area 231 of FIG. 2 or FIG. 3) and a second area (e.g., the second area 232 of FIG. 2 or FIG. 3); a first sensor (e.g., the first sensor 241 of FIG. 2) and a second sensor (e.g., the second sensor 242 of FIG. 2) disposed on at least a part (e.g., the lower portion 301 or 302 of FIG. 3) of, or a side surface (e.g., the side surface 303 or 304 of FIG. 3) adjacent to, an opposite side corresponding to the first area and the second area of the display and each configured to sense a grip; and a processor (e.g., the processor 220 of FIG. 2) operatively connected to the display, the first sensor and the second sensor, wherein the processor is configured to: sense a grip based on a sensor value change of one of the first sensor or the second sensor, receive a touch input sensed in at least a partial area of one of the first area or the second area of the display corresponding to the sensor detecting the grip among the first sensor or the second sensor, and convert to a touch input targeting the entire display area including the first area and the second area.

According to various example embodiments, the processor may be configured to convert a touch input generated in a partial area into a touch input for the entire area by calculating a relative position in the entire area based on the relative location in the partial area of the touch input occurring in the partial area.

According to various example embodiments, the processor may be configured to perform an operation corresponding to the converted touch input on the entire display area in response to the touch input sensed within the control area.

According to various example embodiments, the processor may be configured to display in the control area an image of an area corresponding to the converted touch input in the entire display area.

According to various example embodiments, the processor may be configured to enable a touch input on the cursor to be performed for the entire display area in response to the touch input sensed within the partial area.

According to various example embodiments, the processor may be configured to enable a touch input to be performed on an object displayed for the entire display area in response to the touch input sensed within the partial area.

According to various example embodiments, the sensed touch input may include a click or sliding, and the processor, in response to the sensed touch input, may be configured to convert the click or the sliding to be applied to a corresponding point in the entire display area.

According to various example embodiments, the processor may be configured to identify a point at which a hovering input is recognized with respect to one of the first area or the second area of the display corresponding to the sensor detecting the grip and may receive the touch input within the at least partial area including a specified point at which a hovering input is recognized.

According to various example embodiments, the electronic device may further comprise: a motion sensor, the processor may be configured to: determine a posture of the electronic device based on a sensor value of the motion sensor, and determine the at least partial area by comparing whether the first sensor or the second sensor detects the grip and a hovering input point for the display based on the posture of the electronic device based on the electronic device posture being in a state where the grip detection is possible by at least one of the first sensor or the second sensor.

According to various example embodiments, the processor may be configured to determine at least a partial area of the first area or the second area based on a hovering recognition point for the display based on a grip being sensed from both sides of the first sensor and the second sensor.

Figure 4:
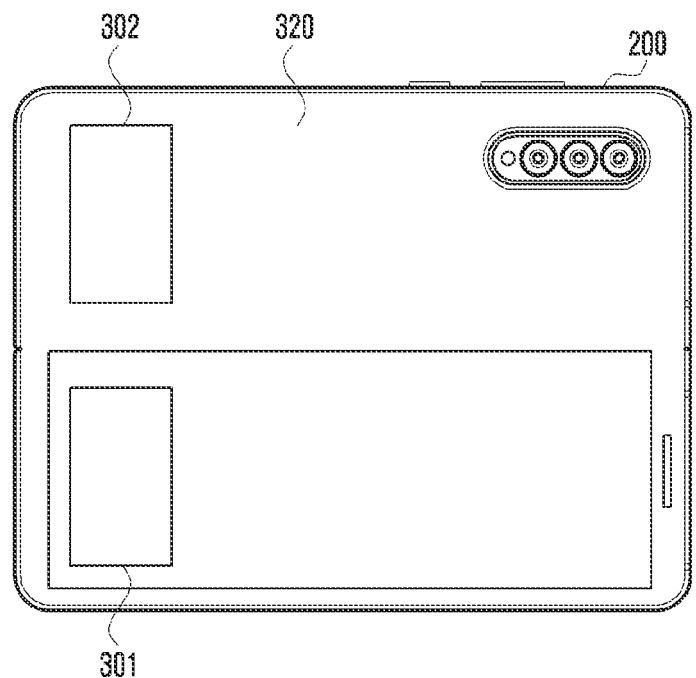
FIG. 4 is a diagram illustrating another example of applying a one handed operation mode according to the arrangement of a display and a grip sensor of an electronic device according to various embodiments.
Figure 4:
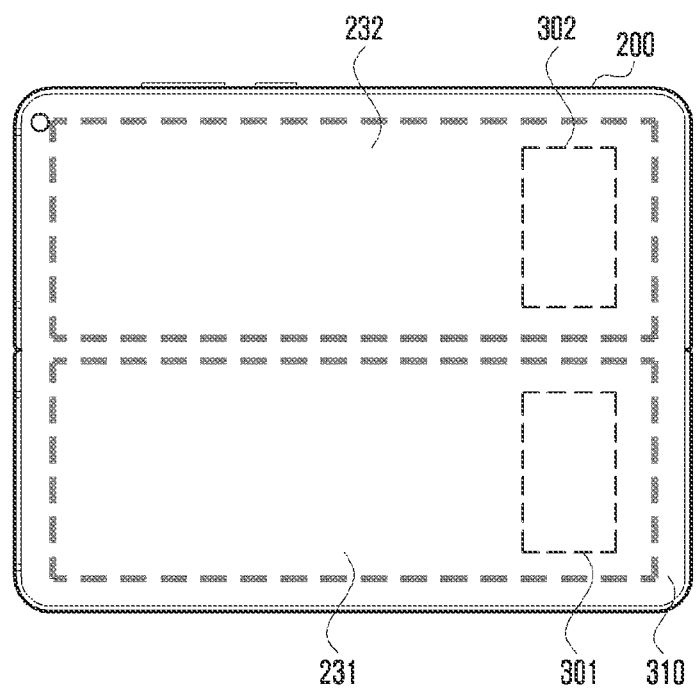
Figure 5:
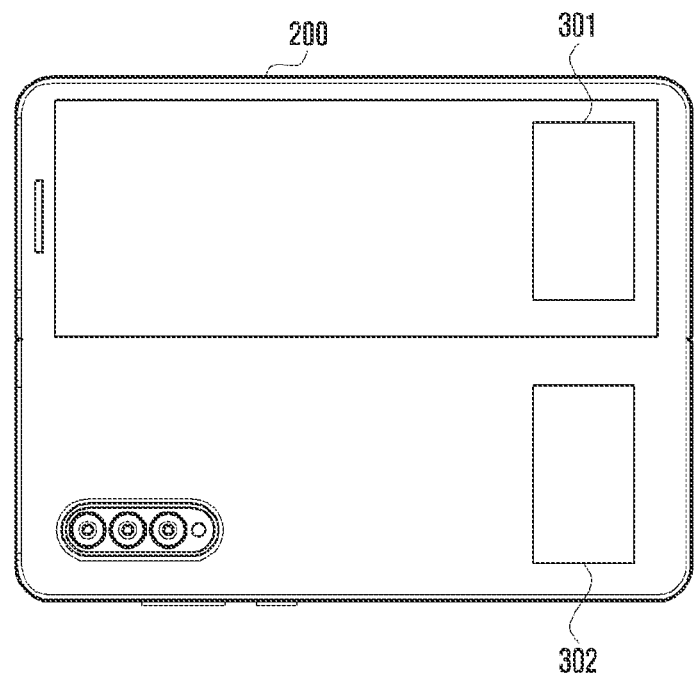
FIG. 5 is a diagram illustrating another example of applying a one handed operation mode according to an arrangement of a display and a grip sensor of an electronic device according to various embodiments.
Figure 5:
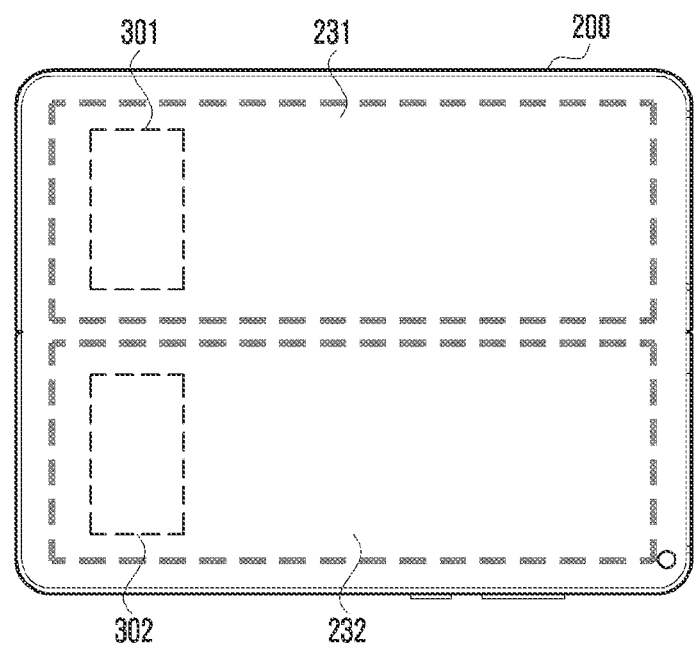

FIG. 4 and FIG. 5 is are diagrams illustrating another example of the application of the one handed operation mode according to the arrangement of a display (e.g., the display 230 of FIG. 2) and a grip sensor (e.g., the grip sensor 240 of FIG. 2) of an electronic device (e.g., the electronic device 200 of FIG. 2) according to various embodiments.

FIG. 4 and FIG. 5 may represent a state in which the electronic device 200 shown in FIG. 3 is substantially rotated by 90 degrees or 270 degrees.

According to various embodiments, the display 230 may include a first area (e.g., the first area 231 of FIG. 2) and a second area (e.g., the second area 232 of FIG. 2).

According to various embodiments, the first sensor 241 of the grip sensor 240 may be disposed at a position 301 opposite to the first area 231 of the display 230, and the second sensor 242 may be disposed at a position 302 opposite to the second area 232 of the display 230.

According to various embodiments, the first sensor 241 of the grip sensor 240 may be disposed at a lower portion 301 of the opposite surface corresponding to the first area 231 of the display 230 or a side surface 303 adjacent to the first area 231. In addition, the second sensor 242 of the grip sensor 240 may be disposed at a lower portion 302 of the opposite surface corresponding to the second area 232 of the display 230 or a side surface 304 adjacent to the second area 232.

With reference to FIG. 4, the first sensor 241 and the second sensor 242 of the grip sensor 240 may be located on the right side of the display 240 or on the left side of the display in the opposite side 320, 301 or 303 and 302 or 304, respectively, in accordance with 90 degree rotation of the electronic device 200.

According to various embodiments, in the case that a grip is detected by the first sensor 241 and/or the second sensor 242, the electronic device 200 may perform the one handed operation mode based on the grip detection position.

According to various embodiments, in the case that a grip is detected by the first sensor 241 and/or the second sensor 242, the electronic device 200 may additionally identify a location where a hovering input to the display 230 occurs, and perform a one handed mode based on the detection position and the hovering input position.

According to various embodiments, the electronic device 200 may perform the one handed operation mode in the case that a grip is detected by the grip sensor, receive a touch input generated from a portion of a right area of the display 230, recognize it as a touch input for the entire area, and perform an operation corresponding thereto.

According to various embodiments, the electronic device 200 may additionally identify a hovering input in the case that a grip is detected by the grip sensor, perform the one handed operation mode in the case that the hovering input occurs only on the right side of the display 230 opposite to the position of the grip sensor, receive a touch input generated in a portion of the right area of the display 230, recognize it as a touch input for the entire area, and perform an operation corresponding thereto.

According to various embodiments, in the case that a grip is detected by the grip sensor and a hovering input is also generated on the left side of the display 230 opposite to the position of the grip sensor, the electronic device 200 may perform the two handed operation mode.

With reference to FIG. 5, the first sensor 241 and the second sensor 242 of the grip sensor 240 may be located on the left side of the display 240 or on the right side of the display in the opposite side 320, 301 or 303 and 302 or 304, respectively, in accordance with 270 degree rotation of the electronic device 200.

According to various embodiments, the electronic device 200 may perform the one handed operation mode based on the grip detection position in the case that a grip is detected by the first sensor 241 and/or the second sensor 242.

According to various embodiments, in the case that a grip is detected by the first sensor 241 and/or the second sensor 242, the electronic device 200 may additionally identify a location where a hovering input to the display 230 occurs, and perform the one handed operation mode based on the sensing position and the hovering occurrence position.

According to various embodiments, the electronic device 200 may perform the one handed operation mode in the case that a grip is detected by the grip sensor, receive a touch input generated from a portion of a left area of the display 230 corresponding to the position of the grip sensor, recognize it as a touch input for the entire area, and perform an operation corresponding thereto.

According to various embodiments, the electronic device 200 may additionally identify a hovering input in the case that a grip is detected by the grip sensor, perform the one handed operation mode in the case that the hovering input occurs only on the left side of the display 230 corresponding to the position of the grip sensor, receive a touch input generated in a portion of the left area of the display 230, recognize or convert as a touch input for the entire area, and perform an operation corresponding thereto.

According to various embodiments, in the case that a grip is detected by the grip sensor and a hovering input is also generated on the right side of the display 230 opposite to the position of the grip sensor, the electronic device 200 may perform the two handed operation mode.

Figure 6:
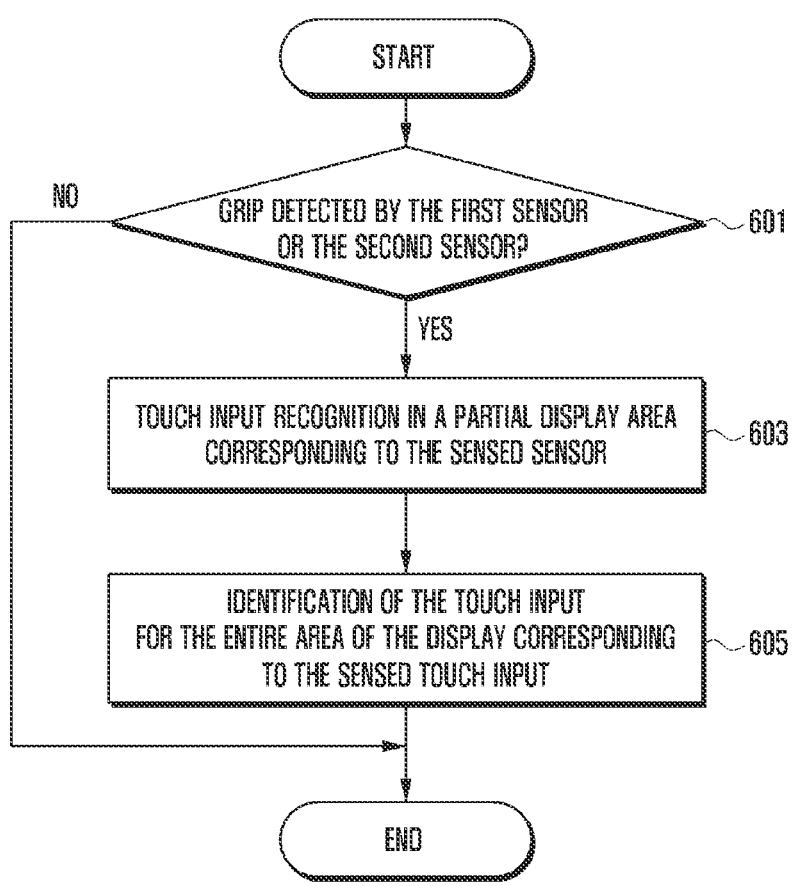
FIG. 6 is a flowchart illustrating an example method of supporting a one handed operation mode of an electronic device according to various embodiments.

FIG. 6 is a flowchart illustrating an example method of supporting a one handed operation mode of an electronic device (e.g., the electronic device 200 of FIG. 2) according to various embodiments.

With reference to FIG. 6, in operation 601, the processor (e.g., the processor 220 of FIG. 2) of the electronic device 200 according to various embodiments may identify whether the grip is detected based on a sensor value of the first sensor (e.g., the first sensor 241 of FIG. 2) or the second sensor (e.g., the second sensor 242 of FIG. 2) that is a grip sensor (e.g., the grip sensor 240 of FIG. 2).

With reference back to FIG. 3, a display 230 may be disposed on the front surface 310 of the electronic device 200, and a grip sensor 240 (e.g., the first sensor 241 and the second sensor 242 of FIG. 2) may be disposed at the rear surface 320 or the side surface 303 or 304 opposite to the front surface 310 where the display 230 is disposed. The display 230 may include a first area (e.g., the first area 231 of FIG. 2) and a second area (e.g., the second area 232 of FIG. 2). The first sensor 241 of the grip sensor 240 may be disposed at the lower portion 301 of the opposite surface corresponding to the first area 231 of the display 230 or the side surface portion 303 adjacent to the first area 231. In addition, the second sensor 242 of the grip sensor 240 may be disposed at the lower portion 302 of the opposite surface corresponding to the second area 232 of the display 230 or a side surface portion 304 adjacent to the second area 232.

According to various embodiments, in operation 603, when a grip is detected (YES in operation 601) the processor 220 may sense a touch input for a portion of the display 230 area (e.g., the left area 301 of FIG. 3) opposite to the position of the grip sensor (e.g., the first sensor 241) where the grip is detected.

According to various embodiments, in operation 605, the processor 220 may identify a touch input targeting the entire area of the display 230 corresponding to the sensed touch input of the partial area 301 of the display 230. The processor 220 may map and convert a touch input sensed in the partial area 301 of the display 230 to a touch input targeting the entire area of the display 230.

With reference back to FIG. 3, according to various embodiments, the processor 220 of the electronic device 200, for example, in the case of detecting the grip by the first sensor 241, may sense a touch input generated in a portion (e.g., a lower portion of the first area) of the first area 231 corresponding to a position 301 of the first sensor 241 and, in response to this, may perform an operation according to the touch input targeting the entire area of the display 230.

Figure 7:
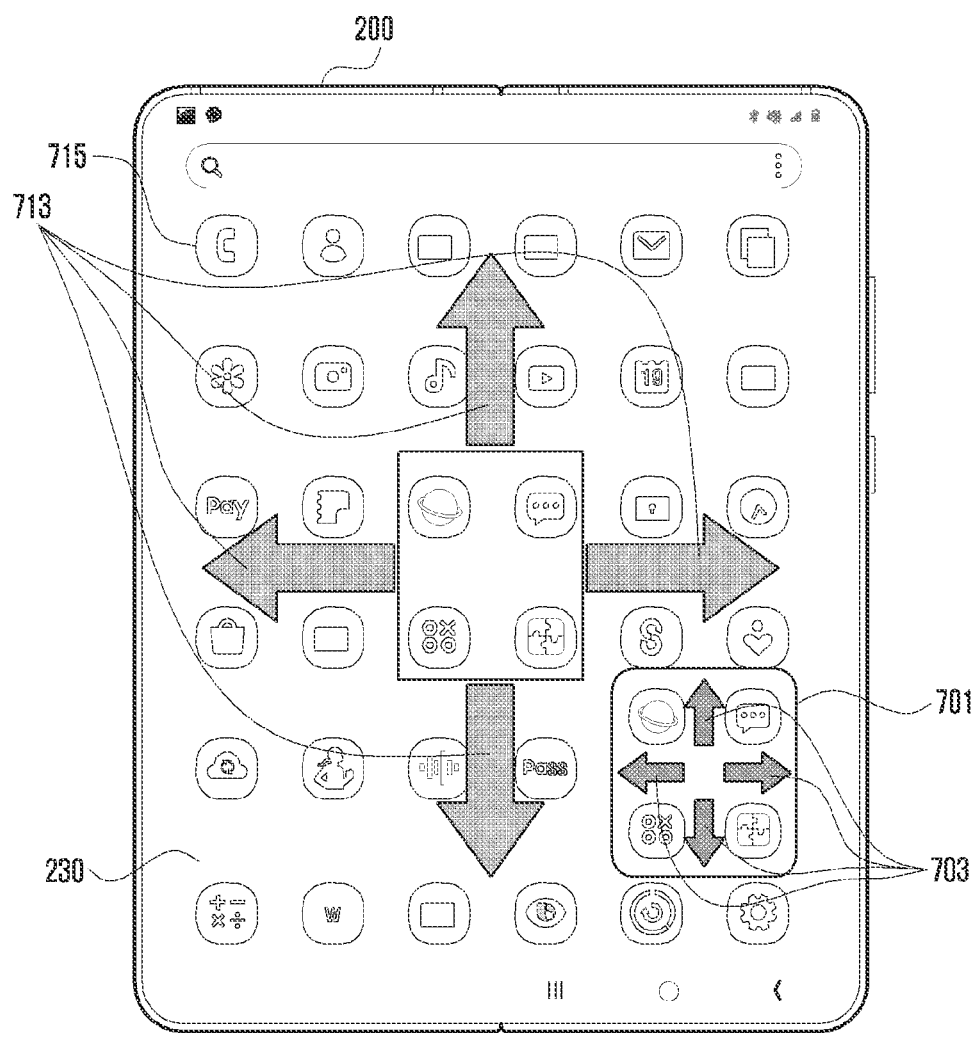
FIG. 7 is a diagram illustrating an example of an input operation according to application of a one handed operation mode of an electronic device according to various embodiments.
Figure 8:
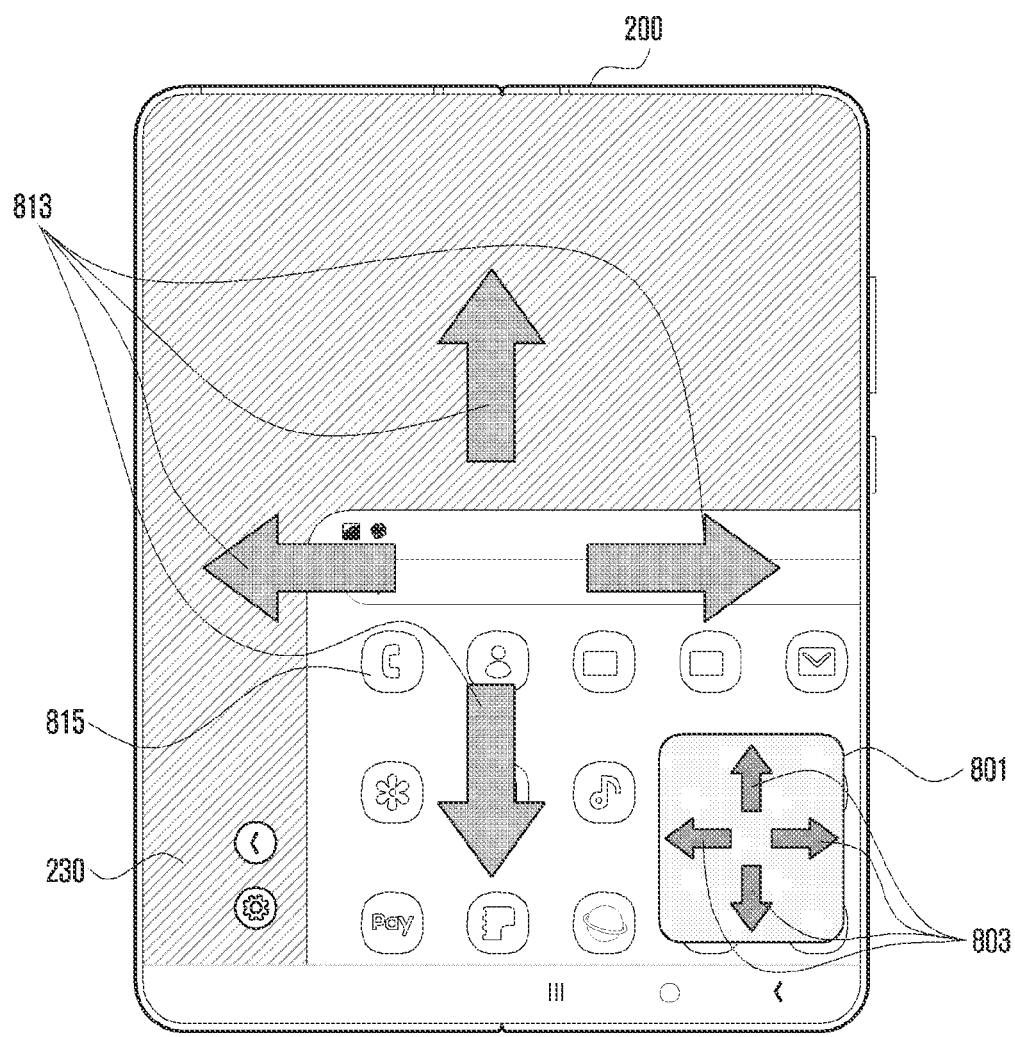
FIG. 8 is a diagram illustrating another example of an input operation according to application of a one handed operation mode of an electronic device according to various embodiments.
Figure 9:
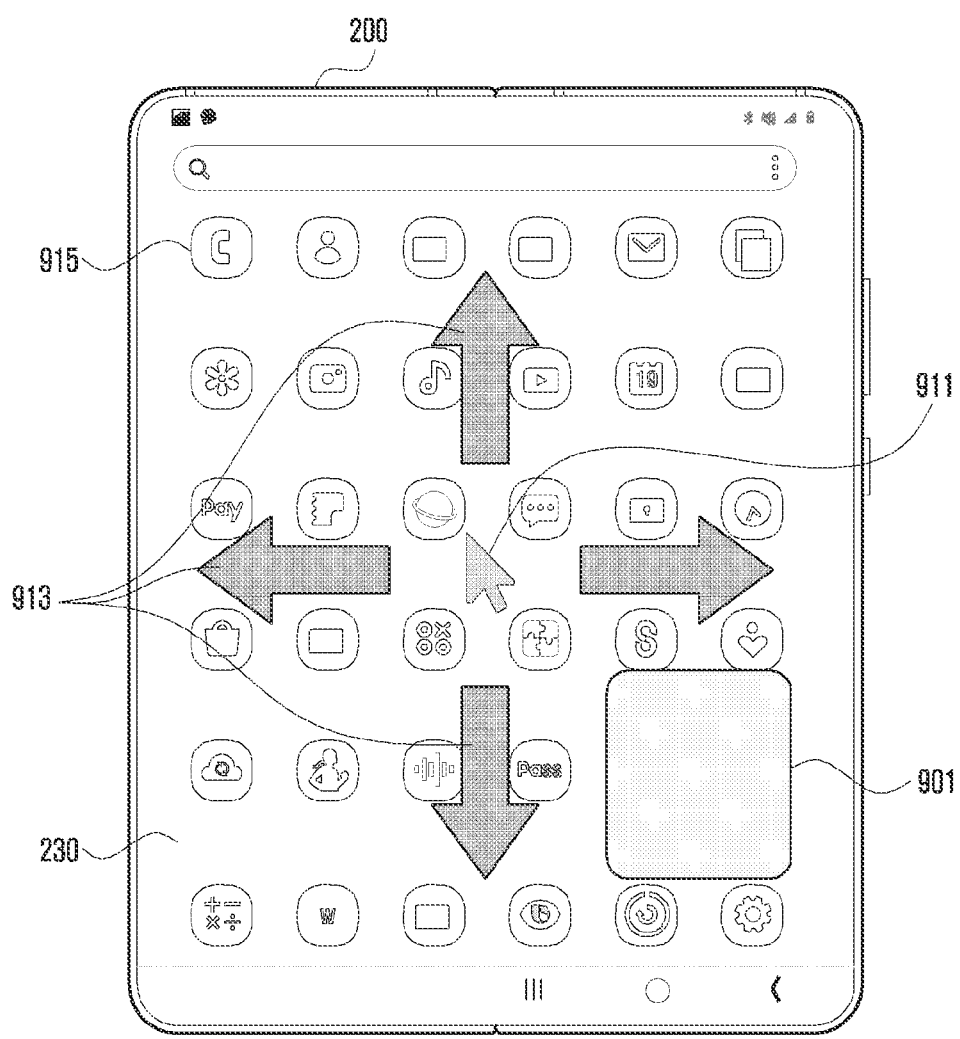
FIG. 9 is a diagram illustrating another example of an input operation according to application of a one handed operation mode of an electronic device according to various embodiments.

FIGS. 7, 8 and 9 (which may be referred to as FIGS. 7 to 9) are diagrams illustrating examples of an input operation based on application of a one handed operation mode of an electronic device (e.g., the electronic device 200 of FIG. 2) according to various embodiments. Hereinafter, with reference to FIGS. 7 to 9, an operation will be explained in greater detail in which the processor (e.g., the processor 220 of FIG. 2) of the electronic device 200, in operation 603 of FIG. 6, maps and coverts a touch input sensed in the partial area 701 (e.g., the lower right area 302 of FIG. 3) of the display (e.g., the display 230 of FIG. 2) to a touch input targeting the entire area of the display 230.

According to various embodiments, the display of the electronic device 200 (e.g., the display 230 of FIG. 2) may display various types of visual information such as various application icons, images, and/or texts. The display 230 of the electronic device 200 may include two or more displays, but, hereinafter, the display 230 may be explained mainly with the main display having the largest area in the electronic device 200.

According to various embodiments, the display 230 may include a touch sensor configured to detect a touch, a hovering sensor configured to detect hovering, and/or a pressure sensor configured to measure the intensity of a force generated by the touch.

According to various embodiments, the processor 220 may identify a touch input targeting the entire area of the display 230 in response to a touch input of a portion of the area of the display 230 where the grip sensor detecting the grip is located. For example, the processor 220 may perform mapping as a sliding touch input with a size corresponding to the entire area of the display 230 in response to the size of the sliding touch input in the case that a sliding touch input is received with respect to a part of the display 230 area on the side where the grip is detected. For example, the processor 220 may recognize that the sliding touch input is generated over the entire area of the display 230 without being limited to a part of the display 230 on which the sliding touch input is actually performed. Accordingly, the processor 220 may control the display 230 to perform an operation corresponding to a sliding touch input targeting the entire area of the display 230.

With reference to FIG. 7, in the case that a touch input including a vertical movement 703 is sensed in a partial area (hereinafter, referred to as a one handed control area) 701 of the display 230 determined according to the one handed operation mode, in response to the received touch input, it may be recognized as a touch input including vertical and horizontal movement 713 for the entire screen of the display 230; and, accordingly, an operation corresponding to the touch input may be performed. For example, the one handed control area 701 may be determined in response to grip detection by one of the two grip sensors (e.g., the first sensor 241 or the second sensor 242 of FIG. 2) as described above with reference to FIGS. 4 to 6. However, for example, in the case that a grip is detected from both of the two grip sensors, the first sensor 241 and the second sensor 242, or a grip is not detected from both sides, based on the hovering detection area of the display 230, the one handed control area 701 may be determined.

In the one handed control area 701 of FIG. 7, at which point in the entire screen of the display 230 the touch input sensed in the one handed control area 701 is identified may be displayed. Accordingly, the user may perform a touch input while looking at the one handed control area 701. For example, a sliding touch input for up/down/left/right movement (703) in the one handed control area (701) is recognized as a touch input for up/down/left/right movement (713) for the entire screen, and an operation corresponding to the recognized touch input may be performed.

For example, in the case that a screen displayed in the one handed control area 701 is moved up to the location of the phone icon by performing a left-upward sliding input and the phone icon is shown in the one handed control area 701, as an operation for selecting the phone icon 715 on the entire screen of the display 230, touching the phone icon displayed in the one handed control area 701 is recognized or converted as a phone icon 715 touch command displayed in the entire screen and the phone application may be performed.

With reference to FIG. 8, in the case that a touch input including vertical and horizontal movement 803 is sensed in a partial area (hereinafter, referred to as a one handed control area) 801 of the display 230 determined according to the one handed operation mode, in response to the received touch input, the touch input is recognized as a touch input including vertical movement 813 for the entire screen of the display 230; and, accordingly, an operation corresponding to the touch input may be performed. For example, the one handed control area 801 may be determined in response to grip detection by one of the two grip sensors (e.g., the first sensor 241 or the second sensor 242 of FIG. 2) as described above with reference to FIGS. 4 to 6. However, for example, in the case that a grip is detected from both of the two grip sensors, the first sensor 241 and the second sensor 242, or a grip is not detected from both sides, the one handed control area 801 may be determined based on the hovering detection area of the display 230.

In response to a touch input sensed in the one handed control area 801 of FIG. 8, the processor 220 of the electronic device 200 may recognize a touch input for the entire screen of the display 230. For example, a sliding touch input for up/down/left/right movement (803) in the one handed control area (801) is recognized as a touch input for up/down/left/right movement (813) for the entire screen, and an operation corresponding to the recognized touch input may be performed.

For example, as an operation for selecting the phone icon 815 on the entire screen of the display 230, the phone icon 815 displayed on the entire screen of the display 230 may be moved to the direction of the one handed control area 801 in accordance with a left-upward sliding input being performed in the one handed control area 801; and the phone application may be performed in the case that releasing the touch or receiving a touch input such as a click or a double click in the one handed control area 801, after the movement of the phone icon 815 is completed, is recognized as or converted to a touch command of the phone icon 815 in response thereto.

With reference to FIG. 9, in the case that a touch input including vertical and horizontal movement is detected in a partial area (hereinafter, referred to as a one handed control area) 901 of the display 230 determined according to the one handed operation mode, the touch input is recognized, in response to the sensed touch input, as a touch input including up/down/left/right movement for the entire screen of the display 230; and, accordingly, an operation corresponding to the touch input may be performed. For example, the one handed control area 901 may be determined in response to grip detection by one of the two grip sensors (e.g., the first sensor 241 or the second sensor 242 of FIG. 2) as described above with reference to FIGS. 4 to 6. However, for example, in the case that a grip is detected from both of the two grip sensors, the first sensor 241 and the second sensor 242, or a grip is not detected from both sides, the one hand control area 901 may be determined based on the hovering detection area of the display 230.

In response to a touch input sensed in the one handed control area 901 of FIG. 9, a mark such as a cursor 911 may be displayed to indicate which point of the entire screen of the display 230 is identified as a touch input. Accordingly, the user may perform a touch input in the one handed control area 901 while identifying the up/down/left/right 913 movement of the movable cursor 911 over the entire area of the display 230. For example, a sliding touch input for moving up/down/left/right in the one handed control area 901 is recognized as a touch input for moving up/down/left/right of the cursor 911 for the entire screen, and an operation corresponding to the recognized touch input may be performed.

For example, as an operation for selecting the phone icon 915 on the entire screen of the display 230, the cursor 911 displayed on the entire screen may be moved to the phone icon 915 position and may overlap with the phone icon 915 area in accordance with a left-upward sliding input being performed in the one handed control area 901; and the phone application may be performed in the case that the cursor 911, for example, detects the touch input of clicking the one handed control area 901 to touch the overlapped phone icon 915, and it is recognized as or converted to a touch input of clicking the phone icon 915 displayed on the entire screen.

Figure 10:
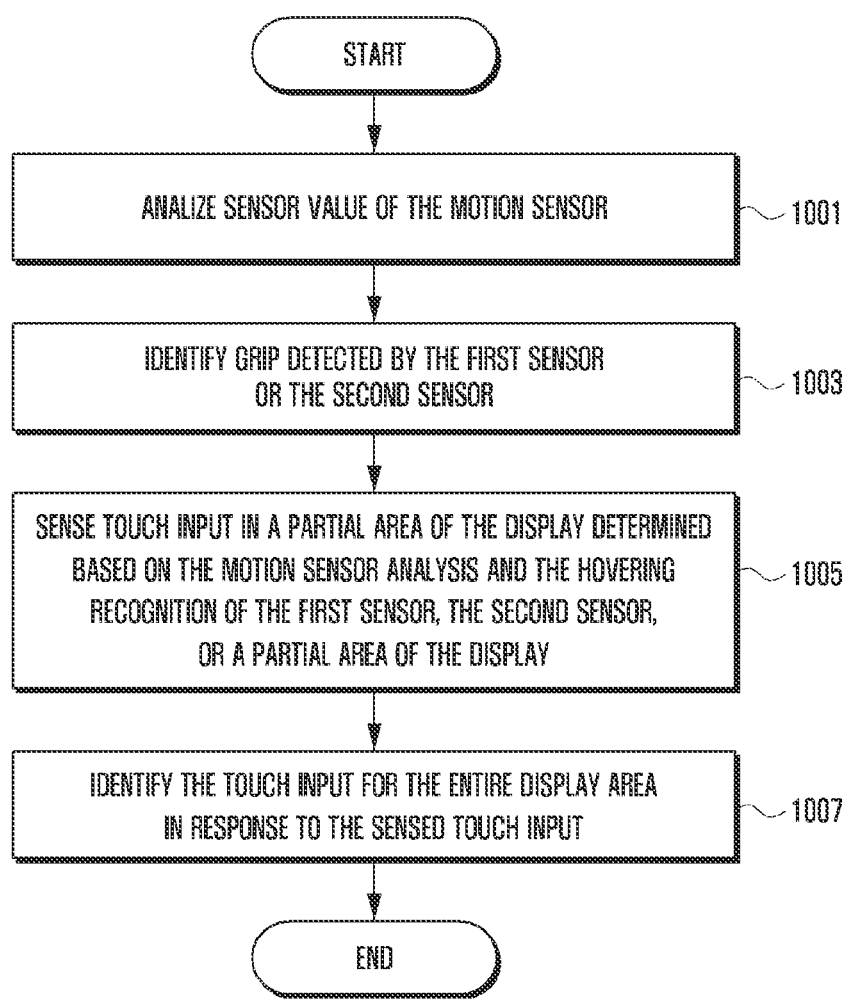
FIG. 10 is a flowchart illustrating an example method of supporting a one handed operation mode of an electronic device according to various embodiments.

FIG. 10 is a flowchart illustrating an example method of supporting a one handed operation mode of an electronic device (e.g., the electronic device 200 of FIG. 2) according to various embodiments.

With reference to FIG. 10, in operation 1001, the processor (e.g., the processor 220 of FIG. 2) of the electronic device 200 according to various embodiments may analyze a sensor value of a motion sensor (e.g., the motion sensor 250 of FIG. 2). According to various embodiments, the motion sensor 250 may include a gyro sensor and/or an acceleration sensor, and the processor 220 may identify the posture of the electronic device 200 based on a sensor value of the motion sensor 250. The posture of the electronic device 200 may include, for example, an upright posture in which the electronic device 200 is held upright, a state in which it is rotated 90 degrees or 270 degrees to the left and right, and a state in which it is rotated upside down by 180 degrees.

According to various embodiments, in operation 1003, the processor 220 may identify from which sensor the grip is detected based on the sensor value of a first sensor (e.g., first sensor 241 of FIG. 2) or a second sensor (e.g., second sensor 242 of FIG. 2) that is a grip sensor (e.g., grip sensor 240 of FIG. 2).

According to various embodiments, in operation 1005, the processor 220 may determine whether to enter the one handed operation mode based on sensor value analysis of the motion sensor 250 and the sensor value of the first sensor 241 or the second sensor 242 or the hovering recognition of the display 230 and may sense the touch input in a portion of the display 230 determined according to the one handed operation mode.

According to an embodiment, the processor 220 may determine whether to enter the one handed operation mode based on the sensor value analysis of the motion sensor 250 and the sensor value of the first sensor 241 or the second sensor 242 or the hovering recognition area.

According to an embodiment, the processor 220 may perform the one handed operation mode in the case that the electronic device 200 is identified in the upright posture as shown in FIG. 3 based on the sensor value of the motion sensor 250, and as described with reference to FIG. 3, for example, in the case that a grip is detected by only one of the first sensor 241 or the second sensor 242, and the processor 220 may determine a part of the display 230 area opposite to the position where the grip is detected as a one handed control area and may enable the touch input within the area to be detected.

According to an embodiment, the processor 220 may perform the one handed operation mode in the case that the electronic device 200 is identified to be rotated by 90 degrees as shown in FIG. 4 based on the sensor value of the motion sensor 250 and in the case that, as explained with reference to FIG. 4, a grip is detected in the first sensor 241 and/or the second sensor 242 of the grip sensor 240 and hovering occurs only in the area where the grip is detected; and the processor 220 may enable the touch input within the area to be detected by determining the vicinity of the detected area where the hovering is detected as a one handed control area. In the case that the grip is not detected, the processor 220 may identify the location of the area where the hovering input to the display 230 is detected, may perform the one handed operation mode in the case that the location where the hovering is detected is the area where the grip sensor of the display 230 is not located, and may enable the touch input within the area to be detected by determining the vicinity of the detected area where the hovering is detected as a one handed control area.

According to an embodiment, the processor 220 may perform the one handed operation mode in the case that the electronic device 200 is identified to be rotated by 270 degrees as shown in FIG. 5 based on the sensor value of the motion sensor 250 and in the case that, as explained with reference to FIG. 5, a grip is detected in the first sensor 241 and/or the second sensor 242 of the grip sensor 240 and hovering occurs only in the area where the grip is detected; and the processor 220 may enable the touch input within the area to be sensed by determining the vicinity of the detected area where the hovering is detected as a one handed control area. In the case that the grip is not detected, the processor 220 may identify the location of the area where the hovering input to the display 230 is detected, may perform the one handed operation mode in the case that the location where the hovering is detected is the area where the grip sensor of the display 230 is not located, and may enable the touch input within the area to be detected by determining the vicinity of the detected area where the hovering is detected as a one handed control area.

According to an embodiment, the processor 220 may enter into a one handed operation mode in the case that the electronic device 200 is identified to be in a 180 degree rotation state where the electronic device 200 is turned upside down based on the sensor value of the motion sensor 250, if the hovering is detected only in a partial area of the display 230 even though the grip is not detected by the grip sensor 240; and the processor 220 may enable a touch input within the area to be detected by determining the vicinity of the detected area where the hovering is detected as a one handed control area.

According to various embodiments, the processor 220 may identify a touch input targeting the entire area of the display 230 in operation 1007 in response to a touch input sensed in the one handed control area. For example, in the case that the touch input sensed in the one handed control area is a touch input such as a click or sliding, the same touch input may be mapped to be received for the entire area for the display 230 in response to a touched point in the one handed control area.

Figure 11:
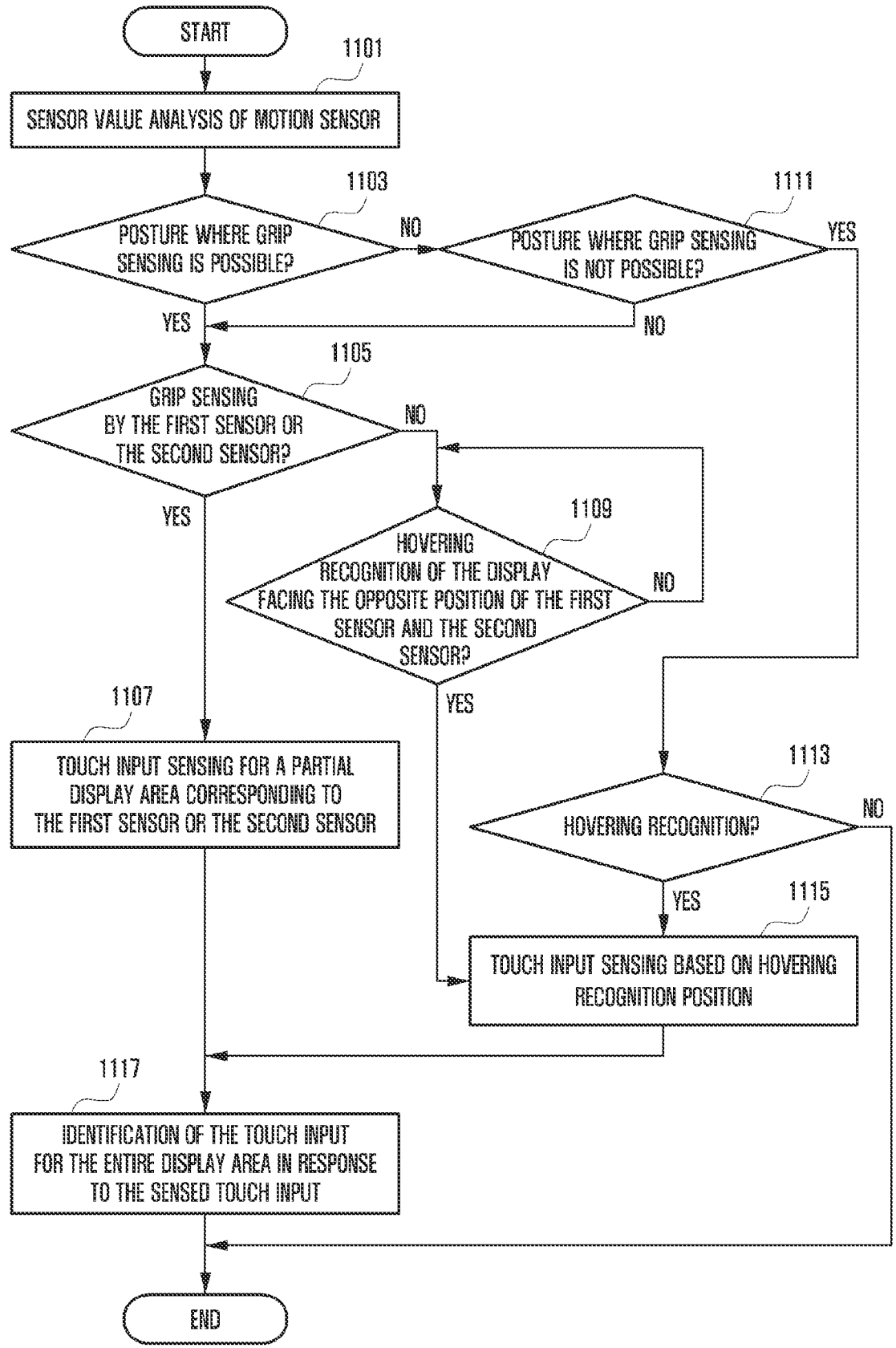
FIG. 11 is a flowchart illustrating an example method of supporting a one handed operation mode of an electronic device according to various embodiments.

FIG. 11 is a flowchart illustrating an example method of supporting a one handed operation mode of an electronic device (e.g., the electronic device 200 of FIG. 2) according to various embodiments.

With reference to FIG. 11, in operation 1101, the processor (e.g., the processor 220 of FIG. 2) of the electronic device 200 according to various embodiments may analyze a sensor value of a motion sensor (e.g., the motion sensor 250 of FIG. 2). According to various embodiments, the motion sensor 250 includes a gyro sensor and/or an acceleration sensor, and the processor 220 may identify the posture of the electronic device 200 based on a sensor value of the motion sensor 250. The posture of the electronic device 200 may include, for example, an upright posture in which the electronic device 200 is held upright, a state in which it is rotated 90 degrees or 270 degrees to the left and right, and a state in which it is rotated upside down by 180 degrees.

According to various embodiments, in operation 1103, the processor 220 may identify whether the posture of the electronic device 200 is a posture in which grip detection is possible with the grip sensor. For example, the processor 220 may identify whether the posture of the electronic device 200 is not rotated or rotated 90 degrees or 270 degrees left and right according to the sensor value analysis of the motion sensor.

According to various embodiments, in the case that the posture of the electronic device 200 is rotated by 90 degrees or 270 degrees to the left and right, the processor 220, in operation 1105, may identify whether a grip is detected by either sensor based on the sensor value of the first sensor (e.g., the first sensor 241 of FIG. 2) or the second sensor (e.g., the second sensor 242 of FIG. 2) of a grip sensor (e.g., the grip sensor 240 of FIG. 2).

According to various embodiments, in the case that it is identified that the grip is detected based on the sensor values of the first sensor 241 and the second sensor 242, in operation 1107 the processor 220 may determine whether to enter the one handed operation mode based on the position of the first sensor 241 and the second sensor 242 and additionally based on the hovering recognition of the display 230; and the processor 220 may sense the touch input in the partial area of the display 230 at a position opposite to the first sensor 241 and the second sensor 242 according to the one handed operation mode. In this case, the processor 220 may detect a touch input in a portion of the display 230 where the hovering of the display 230 is detected.

According to an embodiment, in operation 1111, the processor 220 may identify whether the posture of the electronic device 200 is a posture in which grip detection by the grip sensor is impossible. For example, in the case that the posture of the electronic device 200 is identified to be rotated by 180 degrees based on the sensor value of the motion sensor, in operation 1113, the processor 220 may recognize a location where the hovering input generated on the display 230 occurs.

According to an embodiment, in the case that it is identified that the hovering occurrence position is limited to a partial area of the display 230 according to the hovering input recognition, the processor 220 may define a one hand control area based on the hovering recognition position in operation 1115 and detect a touch input through the one handed control area.

According to an embodiment, the processor 220 may enter into a one handed operation mode in the case that the electronic device 200 is identified to be in a 180 degree rotation state where the electronic device 200 is turned upside down based on the sensor value of the motion sensor 250, if the hovering is detected only in a partial area of the display 230 even though the grip is not detected by the grip sensor 240; and the processor 220 may enable a touch input within the area to be detected by determining the vicinity of the detected area where the hovering is detected as a one handed control area.

According to various embodiments, the processor 220 may identify a touch input targeting the entire area of the display 230 in operation 1117 in response to a touch input sensed in the one handed control area. For example, in the case that the touch input sensed in the one handed control area is a touch input such as a click or sliding, the same touch input may be mapped to be received for the entire area for the display 230 in response to a touched point in the one handed control area.

According to various example embodiments, a method of operating an electronic device may include: detecting a grip based on a sensor value change of one of a first sensor or a second sensor disposed on at least a part of or an adjacent side surface of an opposite side corresponding to a first area and a second area of a display including a first area and a second area; receiving a touch input sensed in at least a partial area of one of the first area or the second area of the display opposite to the sensor detecting the grip among the first sensor or the second sensor; and converting to a touch input targeting an entire display area including the first area and the second area.

According to various example embodiments, the touch input receiving operation and the touch input converting operation may convert the touch input sensed within the partial area into the touch input targeting the entire area of the display by calculating a relative position in the entire area based on the relative position within the partial area of the touch input generated in the partial area.

According to various example embodiments, the method may further include an operation corresponding to the touch input converted to the entire display area in response to the touch input sensed within the control area.

According to various example embodiments, the method may further include displaying, in the control area, an image of an area corresponding to the converted touch input among the entire display area.

According to various example embodiments, the method may further include performing a touch input on a cursor on the entire display area in response to the touch input sensed within the partial area.

According to various example embodiments, the method may further include performing a touch input on an object displayed on the entire display area in response to the touch input sensed within the partial area.

According to various example embodiments, the detected touch input may include a click or sliding, and the touch input converting operation may convert the click or sliding so that a click or sliding can be input in a corresponding point in the entire display area in response to the sensed touch input.

According to various example embodiments, the method may further include identifying a point at which a hovering input is recognized for one of the first area or the second area of the display opposite to the sensor from which the grip is detected, and the touch input receiving operation may receive the touch input within the at least partial area including a point at which the hovering input is recognized.

According to various example embodiments, based on grip detection being possible by at least one of the first sensor or the second sensor, the determining the posture of the electronic device based on a sensor value of a motion sensor (e.g., the motion sensor 250 of FIG. 2) and the posture of the electronic device may further include determining the at least partial area by comparing whether the first sensor or the second sensor detecting a grip and the hovering input point of the display based on the posture of the electronic device.

According to various example embodiments, the touch input receiving operation may determine at least one of the first area or the second area, in the case that a grip is detected from both sides of the first sensor and the second sensor, based on a hovering recognition point for the display.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display including a first area and a second area;
a first sensor and a second sensor disposed on at least a part of a surface opposite to the display including the first area and the second area or a side surface adjacent to the surface, each of the first sensor and the second sensor configured to detect a grip; and
at least one processor operatively connected to the display, the first sensor, and the second sensor, and configured to:
identify at least one of the first sensor or the second sensor which has detected a grip,
perform a one handed operation mode in response to the detecting of the grip by the identified sensor without a separate user operation, to define a partial input area of the first area or the second area corresponding to a position of the identified sensor for receiving a touch input, wherein in the one handed operation mode the first area or the second area is defined as the partial input area for receiving inputs for an entire area of the display including the first area and the second area,
receive a touch input on the defined partial area, and
convert the touch input to a touch input targeting the entire area of the display including the first area and the second area.

2. The electronic device of claim 1, wherein the at least one processor is configured to: calculate a relative position in the entire area based on a relative position of the touch input generated in the partial area within the partial area; and convert the touch input sensed in the partial area to the touch input targeting the entire display area.

3. The electronic device of claim 2, wherein the at least one processor is configured to perform an operation corresponding to the touch input converted to the entire area of the display in response to the touch input sensed within the partial area.

4. The electronic device of claim 2, wherein the at least one processor is configured to control the display to display, in the partial area, an image of an area corresponding to the converted touch input among the entire area of the display.

5. The electronic device of claim 1, wherein the at least one processor is configured to perform an operation corresponding to a touch input on a cursor on the entire area of the display in response to the touch input sensed within the partial area.

6. The electronic device of claim 1, wherein the at least one processor is configured to perform an operation corresponding to a touch input on an object displayed on the entire area of the display in response to the touch input sensed within the partial area.

7. The electronic device of claim 1, wherein the sensed touch input includes a click or a sliding input and the processor is configured to convert the click or the sliding input to a corresponding point in the entire area of the display in response to the sensed touch input.

8. The electronic device of claim 1, wherein the at least one processor is configured to identify a point at which a hovering input is recognized with respect to one of the first area or the second area of the display corresponding to the sensor detecting the grip, and receive the touch input within the defined partial area.

9. The electronic device of claim 1, further comprising a motion sensor, wherein the at least one processor is configured to: determine a posture of the electronic device based on a sensor value of the motion sensor, and determine the defined partial area by comparing whether the first sensor or the second sensor detects the grip and a hovering input point for the display based on the posture of the electronic device based on the posture of the electronic device being in a state where grip detection is possible by at least one of the first sensor or the second sensor.

10. The electronic device of claim 1, wherein the at least one processor is configured to determine the defined partial area based on a hovering recognition point for the display based on a grip being detected from both the first sensor and the second sensor.

11. A method of operating an electronic device, the method comprising:
identifying one of a first sensor or a second sensor which has detected a grip based on a sensor value change in one of the first sensor and the second sensor disposed oppositely on at least a part of or an adjacent side surface corresponding to a first area and a second area of a display including the first area and the second area;
performing a one handed operation mode in response to the detecting of the grip by the identified sensor without a separate user operation, to define a partial input area of the first area or the second area corresponding to a position of the identified sensor for receiving a touch input, wherein in the one handed operation mode the first area or the second area is defined as the partial input area for receiving inputs for an entire area of the display including the first area and the second area;
receiving a touch input on the defined partial area; and
converting to a touch input targeting the entire area of the display including the first area and the second area.

12. The method of claim 11, wherein the touch input converting operation comprises:
calculating a relative position in the entire area based on a relative position of the touch input generated in the partial area within the partial area; and
converting the touch input sensed in the partial area to the touch input targeting the entire display area.

13. The method of claim 12, further comprising an operation corresponding to the touch input converted to the entire area of the display in response to the touch input sensed within the partial area.

14. The method of claim 12, further comprising displaying in the partial area an image of an area corresponding to the converted touch input among the entire area of the display.

15. The method of claim 11, further comprising performing an operation corresponding to a touch input on a cursor on the entire area of the display in response to the touch input sensed within the partial area.

16. The method of claim 11, further comprising performing an operation corresponding to a touch input on an object displayed on the entire area of the display in response to the touch input sensed within the partial area.

17. The method of claim 11, wherein the sensed touch input comprises a click or a sliding input and the touch input converting operation comprises, in response to the sensed touch input, converting the click or the sliding input to a corresponding point in the entire area of the display.

18. The method of claim 11, further comprising identifying a point at which a hovering input is recognized for one of the first area or the second area of the display corresponding to the sensor detecting the grip, and a touch input receiving operation comprises receiving the touch input within the defined partial area including a point at which the hovering input is recognized.

19. The method of claim 11, further comprising:
determining a posture of the electronic device based on a sensor value of a motion sensor; and
determining the defined partial area by comparing whether the first sensor or the second sensor detects the grip and a hovering input point for the display based on the posture of the electronic device based on the posture of the electronic device posture being in a state where grip detection is possible by at least one of the first sensor or the second sensor.

20. The method of claim 11, wherein the touch input receiving operation comprises determining the defined partial area based on a hovering recognition point for the display based on a grip being detected from both the first sensor and the second sensor.

* * * * *